United States Patent [19]

Heyring

[11] Patent Number: 5,601,306
[45] Date of Patent: Feb. 11, 1997

[54] VEHICLE SUSPENSION SYSTEM

[75] Inventor: Christopher Heyring, Eagle Bay, Australia

[73] Assignee: Kinetic Limited, Dunsorough, Australia

[21] Appl. No.: 628,626

[22] PCT Filed: Oct. 28, 1994

[86] PCT No.: PCT/AU94/00661

§ 371 Date: Apr. 9, 1996

§ 102(e) Date: Apr. 9, 1996

[87] PCT Pub. No.: WO95/11814

PCT Pub. Date: May 4, 1995

[30] Foreign Application Priority Data

Oct. 28, 1993 [AU] Australia ............... PM2080

[51] Int. Cl.$^6$ ................................. B62D 7/02
[52] U.S. Cl. .................. 280/702; 280/6.11; 280/772
[58] Field of Search .................. 280/6.11, 702, 280/6.1, 6.12, 709, 772, 704, DIG. 1; 180/41

[56] References Cited

U.S. PATENT DOCUMENTS

| | | | |
|---|---|---|---|
| 5,087,072 | 2/1992 | Kawarasaki | 280/772 |
| 5,090,726 | 2/1992 | Nakamura | 280/709 X |
| 5,096,219 | 3/1992 | Hauson et al. | 280/772 X |
| 5,258,913 | 11/1993 | Baldauf | 364/424.05 |
| 5,265,913 | 11/1993 | Scheffel | 280/840 |
| 5,322,321 | 6/1994 | Yopp | 280/707 |
| 5,443,283 | 8/1995 | Hawkins | 280/709 |
| 5,480,188 | 1/1996 | Heyring | 280/772 |
| 5,499,845 | 3/1996 | Geiger et al. | 280/6.1 X |

FOREIGN PATENT DOCUMENTS

| | | |
|---|---|---|
| 2009062 | 6/1979 | United Kingdom . |
| 01948 | 2/1993 | WIPO . |
| 19945 | 10/1993 | WIPO . |

*Primary Examiner*—Christopher P. Ellis
*Attorney, Agent, or Firm*—Birch, Stewart, Kolasch & Birch, LLP

[57] ABSTRACT

A vehicle suspension system comprising a vehicle body supported upon a plurality of wheels arranged in lateral and longitudinal spaced relation. Individual double acting fluid rams connected between each wheel and the vehicle body to provide the support for the body, each ram having an upper and lower hydraulic chamber. Conduits individually communicating the upper chamber of the respective rams with the lower chamber of the respective diagonally opposite ram and fluid reservoir, and fluid pump arranged to draw fluid from the reservoir. Body attitude control means operable to connect each conduit individually to the pump or reservoir to respectively supply fluid to or receive fluid from the connected conduit. Individual actuators operable in response to the disposition of a respective wheel relative to the vehicle body to effect selective actuation of the control means to connect the circuit of that wheel to the pump or reservoir to maintain a preselected attitude of the vehicle body.

14 Claims, 4 Drawing Sheets

VEHICLE SUSPENSION SYSTEM

BACKGROUND OF THE INVENTION

This invention relates to improvements in the suspension system for a vehicle, and is specifically related to controlling the disposition of the vehicle body relative to the vehicle wheels when the vehicle is subject to load distribution changes.

In recent times there has been a trend towards resilient sprung suspension systems incorporating variable damping and spring rates in an attempt to improve vehicle stability and reduce generally vertical movement of the vehicle body relative to the surface being traversed. Some more advanced suspension systems, commonly referred to as "active" and "semi-active" suspensions, incorporate a number of electronic sensors which monitor information, such as vertical wheel travel and body roll, as well as speed, acceleration, steering and braking commands. This and other data is processed by a computer which instructs hydraulic or pneumatic actuators to override the normal function of resilient springs in order to interpret, compensate and adjust the suspensions performance to suit speed, terrain and other factors in order to maintain a level ride and controlled distribution of weight to all wheels. These suspension systems require an external intelligent back-up system, and call for a substantial input of external energy, drawn from the vehicle engine, to operate actuators that affect the adjustment to the suspension system.

A range of constructions of "active" and "semi-active" suspensions for vehicles have been proposed including systems operating on the basis of compression and/or displacement of fluids, such systems currently in use incorporate a pump to maintain the working fluid at the required pressure and to effect high speed fluid distribution, and sophisticated control systems to regulate the operation of the suspension system in accordance with sensed road and/or vehicle operating conditions. These known systems incorporating pumps and electronic control systems, that are both required to operate substantially continuous while the vehicle is in operation, and are comparatively expensive to construct and maintain, and require substantial energy input in operation. As a result, these systems have limited acceptability in the vehicle industry.

There is disclosed in International Patent Application No. WO93/01948 a vehicle having a load support body, and a pair of front ground engaging wheels and a pair of rear ground engaging wheels connected to the body to support same, and wherein each wheel is displaceable relative to the body in a generally vertical direction. Interconnected between each wheel and the body is a fluid ram including upper and lower fluid filled chambers that vary in volume in response to vertical movement between the respective wheels and the body. In that suspension system a front wheel ram and the diagonally opposite rear wheel ram have the upper chamber of the front ram interconnected with the lower chamber of the rear ram and the lower chamber of the front ram interconnected to the upper chamber of the rear ram. Similarly the respective chambers of the other front ram and rear ram are likewise interconnected. There is thus provided two individual fluid circuits, each comprising a front ram and a diagonally opposite rear ram. Each of the conduits interconnecting the respective upper and lower chambers has a conventional pressure accumulator in communication therewith. The two circuits are interconnected to a pressure balance device arranged to maintain equip-pressure in the two circuits as is described in detail in the previously referred to International Patent Application No. WO93/01948.

As most vehicles are non-symmetrically loaded for a large portion of the operating time thereof such that loads carried are located so the rear wheels carry more weight than the front wheels, or the load is closer to one side of the vehicle than the other, thus causing the vehicle body to tilt toward the heavier side or end.

SUMMARY OF THE INVENTION

It is the object of this invention to provide a vehicle suspension system which determines changes in the vehicular height and inclination and adjusts the fluid in appropriate circuits to establish the optimum relative heights, while also providing the optimum load distribution to the wheels.

With this object in view, there is provided a vehicle suspension system comprising a vehicle body, a plurality of wheels arranged in lateral and longitudinal spaced relation to support the vehicle body, individual fluid ram means operably connected between each wheel and the vehicle body to provide support for the body, each fluid ram means comprising a double acting ram having an upper and lower hydraulic chamber, conduit means individually communicating the upper chamber of the respective rams with the lower chamber of the respective diagonally opposite ram to comprise a fluid circuit, a fluid reservoir to receive fluid from the fluid circuit, a fluid pump to deliver fluid to the fluid circuit as required, control means operable to provide communication of each fluid circuit selectively with the pump or reservoir for respective supply of fluid to or reception of fluid from the connected fluid circuit to control the fluid volume in the fluid circuits, and actuator means operable in response to the disposition of a respective wheel relative to the vehicle body to effect actuation of the control means to connect the fluid circuit of that wheel to the pump or reservoir as required so that in operation the collective positional relation of all the wheels defines the height and attitude of the vehicle.

Conveniently, the actuator means (and the control means) is interconnected between the wheel and the body to respond to the relative vertical disposition therebetween to open or close said body attitude control means. A further control valve is also provided said attitude control means associated with the individual wheels to exercise overall control of the fluid flow from the pump and to the reservoir respectively. The further control valve is responsive to imbalance within set limits in the pressure in the respectve circuits interconnecting the two pairs of diagonally opposite wheels. Thus, fluid is only permitted to flow from the pump and/or to the reservoir when the imbalance between the respective circuits is within the set limit. This construction enables the control means to level the vehicle in response to load changes provided the articulation of the wheels is within set limits.

The invention will be more readily understood from the following description of one practical arrangement of the suspension system as illustrated in the accompanying drawings.

DETAILED DESCRIPTION

The drawing showing the suspension in different working dispositions have the same reference numerals for the same components in each drawing.

The chassis or body 13 of the vehicle has connected thereto. Linkages which can be in the form of known components commonly referred to as leading arms, trailing arms, radius rods, wishbones, or struts, which locate the wheels relative to the vehicular chassis 13 and are identified as 9, 10, 11 and 12. Strut 9 locates wheel unit 5 with reference to chassis 13, strut 10 locates wheel unit 6 to the chassis 13, strut 11, interconnects, wheel unit 7 to the chassis 13, while strut 12 interconnects wheel unit 8 and chassis 13. The struts are normally mounted at each end by way of rubber bushings or socket and ball couplings which provide flexible omnidirectional couplings.

Each of the hydraulic rams, 1, 2, 3 and 4 is of the double acting variable length construction and having variable volume upper and lower chambers. The upper chambers are all 'a' while the lower chambers are marked 'b' so that 1a for example refers to the upper chamber of the front left ram 2.

Each ram is hydraulically connected to the diagonally opposite ram by way of two connecting conduits or pipes so that the upper chamber 1a of the front left wheel ram 1 is directly in communication with the back right lower chamber 3b, while lower chamber 1b is connected to upper chamber 3a. Similarly the chambers of the front right ram chambers 2a and 2b are connected to rear left ram chambers 4b and 4a respectively. The interconnecting conduits are numbered 14 between 1a–3b, 15 between 1b and 3a, while the diagonally opposite pair of pipes are numbered 16 and 17 which interconnect 2a–4b, and 2b–4a respectively.

These conduits are normally constructed of reinforced rubber or steel and usually measure between ¼" to 1" in bore to provide relatively unrestricted communication between the ram chambers and accumulators and between diagonally opposite rams. The sizing of these tubes is important and should be selected in conjunction with optional restrictor valves set into the conduits to fine tune the level of communication between diagonally opposite rams so that maximum communication occurs between the rams and their nearest associated accumulator for dynamic high velocity low amplitude input absorption while also providing sufficient restriction/friction in the conduits to ensure the high frequency inputs are not primarily transferred to the accumulators associated with the hydraulic circuits of other wheels. The portion of the connecting conduits between the rams and their nearest accumulators should therefore be of a larger bore than the conduits between the accumulators of one wheel and the accumulators of the other diagonally opposite wheel (and the branch lines to the load distribution unit referred to hereinafter). These need only to be large enough to permit fluid flow of slower and larger wheel travel movements associated with axle articulation and cornering forces.

Figure 1:
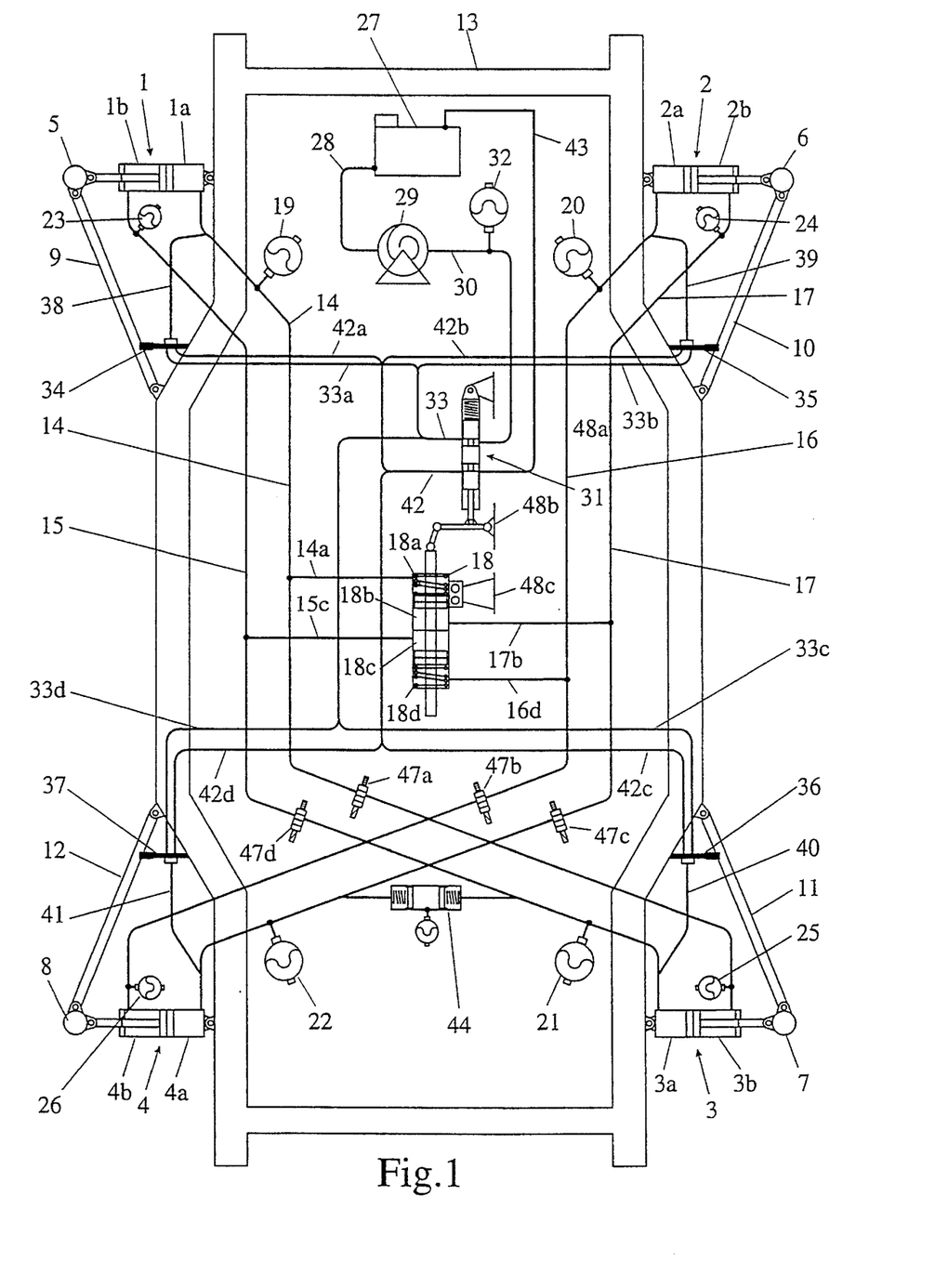
FIG. 1 is a diagrammatic representation of the suspension system with the vehicle on level ground with the vehicle body also level.

With reference to FIG. 1, four accumulators or gas springs 19, 20, 21, 22 are normally provided and are in direct communication with the rams 1, 2, 3 and 4 respectively or via the nearest portions of the communicating conduits 14, 15, 16 and 17 respectively. Additional optionally and usually smaller accumulators numbered 23, 24, 25 and 26 are also similarly associated with rams 1, 2, 3 and 4 in the same respective sequence.

A hydraulic tank or reservoir 27 is connected via conduit 28, to hydraulic pump 29 to provide fluid to the pump. This may be an electrically driven pump or a pump driven by a vehicle engine such as by the fan belt either by itself or in parallel with the vehicle's power steering pump. Conduit 30 interconnects the pump 29 to a spool valve 31 and at a convenient location between the pump 29 and the spool valve 31, an accumulator 32 is normally located to provide a pressurised storage of fluid to be used on demand. The spool valve 31 also communicates the conduit 43 from the reservoir 27 to the conduit 42.

The spool valve 31 connects with two conduits 33 and 42 as shown and provides a switching means to vary and close off the flow through the two conduits 33 and 42. Conduit 33 is a continuation of conduit 30 and therefore conducts the fluid once it has passed through valve 31 when it is in the open position. Conduit 33 subdivides into four smaller tributaries 33a, 33b, 33c, 33d which conduct pressurised fluid to four additional spool valves numbered 34, 35, 36, 37 which are associated one with each wheel struts 9, 10, 11 and 12 respectively.

Spool valve 34, is featured by way of example in FIG. 4, and will be described in more detail in context therewith. Single conduits 38, 39, 40 and 41 interconnects each of the spool valves 34, 35, 36, 37 respectively with main conduit 14, 16, 15, 17 also respectively.

It should be noted that all conduits may be joined to any appropriate part of the associated fluid circuits and are only drawn in the actual positions shown in the figures for convenience and clarity. Moreover, hydraulic manifolds may be centrally located so that these functionally interconnect the various parts of the circuits without there being a requirement to route the conduits substantially all around the vehicle. Fluid supply and return conduits such as conduits 30, 33 and 42 are normally made of small bore steel pipe similar to that used in vehicle brake systems.

Fluid which is to be returned to the central tank 27 form the main circuits 14, 15, 16, 17 is conducted to spool valves 34, 35, 36, 37 via common conduits 38, 39, 40, 41 and from said spool valves through return conduits 42a, 42b, 42c, 42d respectively which may conveniently be joined to form one simple pipe 42 as shown. Conduit 42 is interrupted by spool valve 31 and when this is in the open position fluid may be returned via the tube 43 leading back to the reservoir 27.

Figure 4:
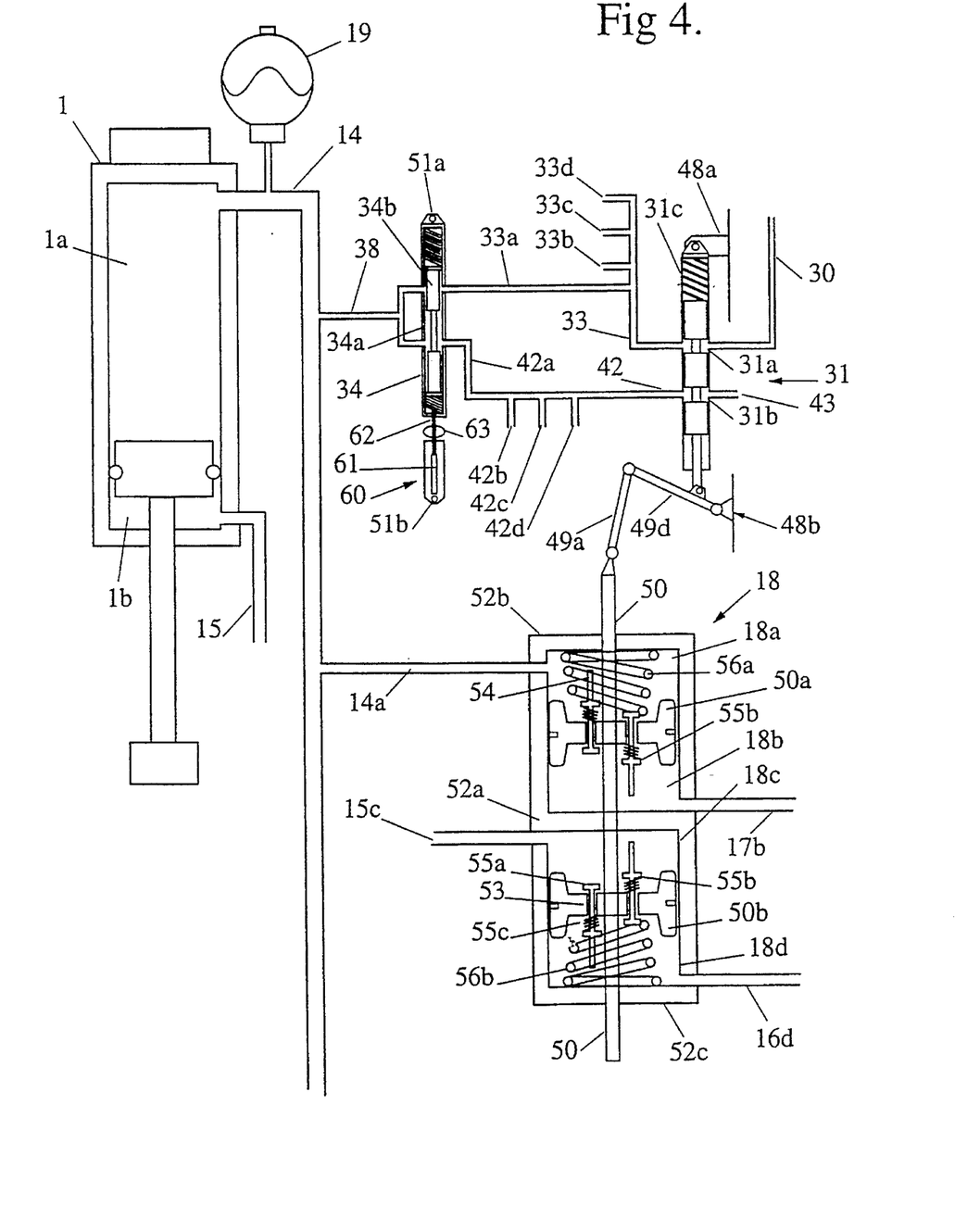
FIG. 4 shows in more detail the control mechanisms as shown in FIGS. 1 to 3.

The central load distribution unit 18 is mounted to the vehicles body or chassis in any convenient manner as is the spool valve 31 and also as is the termination of mechanical linkage 49 between these two components as will be seen in greater detail in FIG. 4.

The load equalisation unit 18 has four internal chambers of variable volume marked 18a, 18b, 18c, 18d and are hydraulically connected with respective main conduits so that chamber 18a is in communication with the main conduit 14 by way of branch line 14a, while chamber 18b communicates with main conduit 17 via branch line 17b, and chamber 18c communicates with main conduit 15 via branch line 17b, and chamber 18c communicates with main conduit 15 via conduit 15c, and chamber 18d communicates with conduit 16 via branch line 16d. The function and operation of the load distribution unit 18 is described in further detail hereinafter and in International Patent Application No. WO93/01948 previously referred to herein.

The branch line 14a to 16d may generally be of similar bore size to the main hydraulic conduits to which they connect. In practice the branch lines may often be omitted in entirely as the main conduits can be arranged so as to run directly past the load equalisation unit so that a single hydraulic fitting can be used to functionally joins each of the main tubes to each of the respective equalisation chambers.

Located at any point in the vehicle there may be provided, additionally and optionally, an extra spring component (of any known construction) which is acted upon by two (or more) independent circuits to soften the ride of those two circuits with reference to those specific circuits only. Accordingly, in the drawings a unit 44 is shown interconnected between conduits 17 and 15 near rams 4 and 3 respectively to provide supplementary resilience towards the rear of the vehicle specifically in the pitch and squat longitudinal axis of the vehicle. Similar units to 44 may alternatively or additionally be interposed between conduits 14 and 16 to provide extra compliance of the front of the vehicle in the same axis of required or such units may be combined in series to function collectively to stiffen roll response.

Components 47a, 47b, 47c and 47d represent valves or restrictors which can variably restrict and/or stop the flow of fluid along the associated conduits. These valves may comprise of spool or poppet valves with electrical solenoid actuation which respond to commands from one or more sensors such as an accelerometer and throttle movement or position sensor, or the valves may be actuated via a hydraulic pressure actuator which responds to relative varying pressure gradients or mechanical means which respond to simple inertial resistance of weight in one or more planes.

FUNCTIONAL SEQUENCE OF EVENTS

It is assumed that the functions of the chassis 13, the radius rods 9, 10, 11, 12 and the interconnecting bushes are as has previously been discussed. Similarly the components such as the hydraulic rams 1, 2, 3, 4, the conduits 14, 15, 16 and 17, the pump 29, and the tank 43, and all other items described in the Patent Applications previously referred to do not require further description with regard to their functions in the contexts shown.

FIG. 1 therefore illustrates a vehicle which is stationary and on a flat plane surface. It was described in the previous Patent Applications that the vehicles fitted with the type of hydraulic suspension shown were optionally able to be levelled, tilted, raised and lowered. In FIG. 1 therefore, the hydraulic rams are shown in their mid stoke position indicating the vehicle is set up at its normal driving height and the vehicle is on a flat or plane surface. When the rams are in the mid stroke position there is as much potential wheel travel in the upwards direction as there is in the downward direction therefore axle articulation is maximised.

Figure 2:
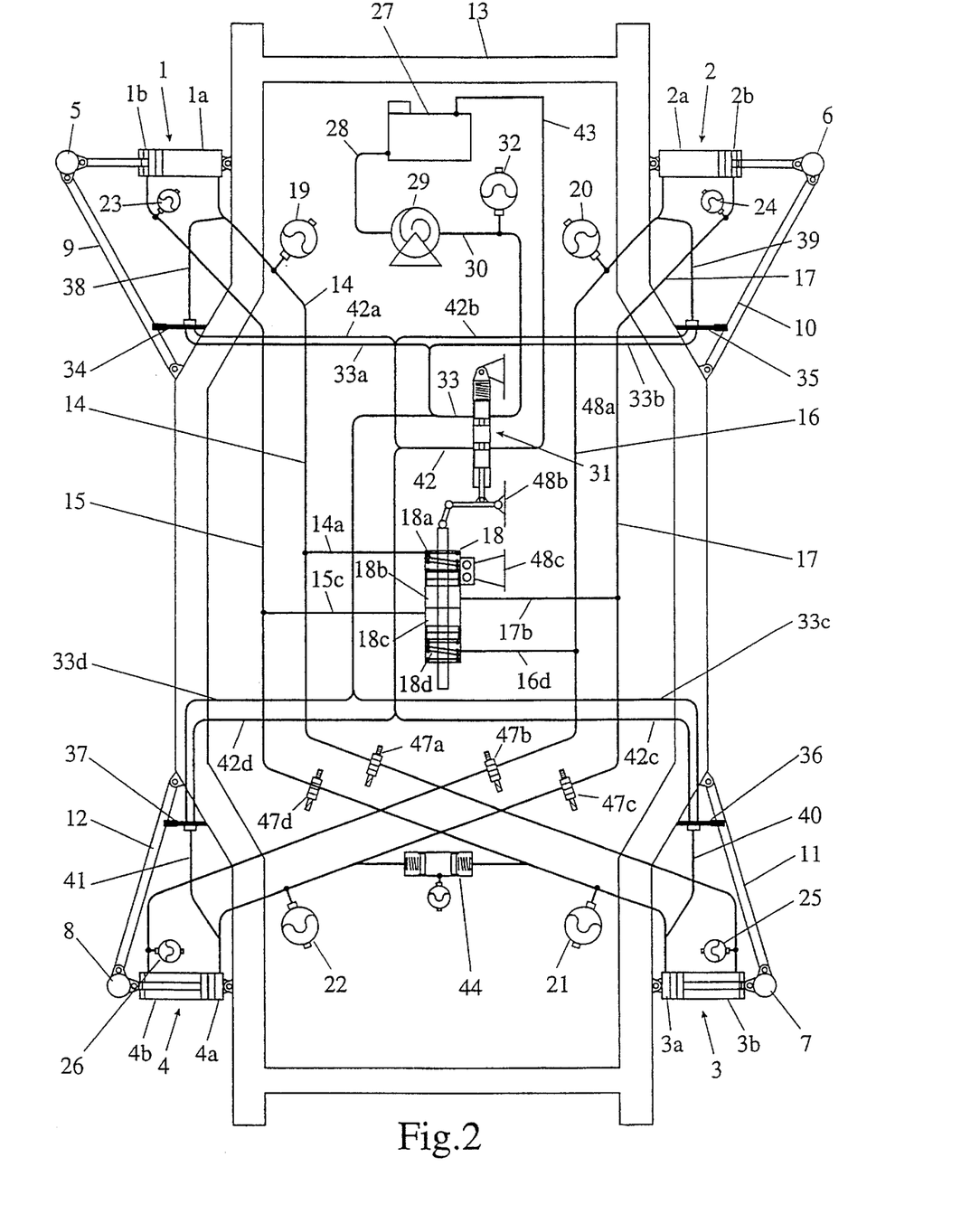
FIG. 2 is similar to FIG. 1 but the front rams are fully extended and the rear fully retracted.

FIG. 2, illustrates a vehicle in which the front rams 1 and 2 are fully extended so that the front of the vehicle is said to be at maximum height while the rear of the vehicle is set at the minimum height because the rams 3 and 4 are fully contracted. It can also be assumed from this diagram that the vehicle is on a flat plane for the same reasons as sighted above.

Figure 3:
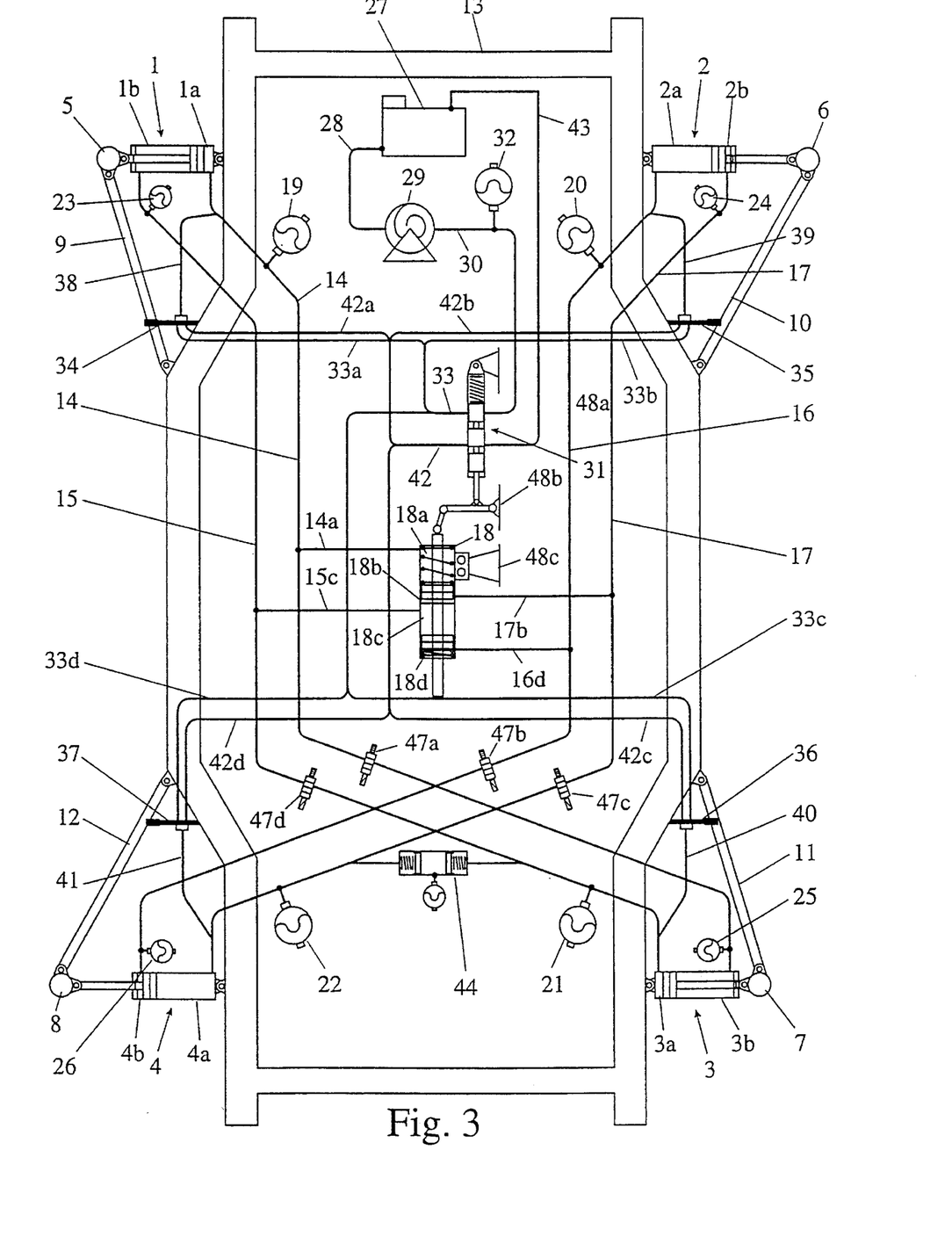
FIG. 3 shows the rams in the reverse disposition to that shown in FIG. 2.

FIG. 3, shows a vehicle in which the front left and rear right rams 1 and 3 are fully retracted while the front right and rear left rams 2 and 4 are fully extended. It can be deduced from this FIG. 3 therefore that the vehicle is not on a flat plane surface and that the front left wheel 1 and the rear right wheel 3 are raised relative to the diagonally opposite wheels 2 and 4 due to undulations in the terrain surface as opposed to a voluntary tilting as in FIG. 2. The situation shown in FIG. 3 is commonly referred to as axle articulation.

FIG. 4 is an enlarged detail drawing of portion of the suspension levelling and control apparatus as shown in the previous drawings. The conduit 30 shown in this drawing refers to the same conduit shown in FIGS. 1, 2 and 3 being the connecting pipe taking fluid from the pump 29 (and accumulator 32) to the spool valve 31.

Similarly conduit 43 corresponds with the same conduit in the other drawings and this conducts fluid back from the spool valve 31 to the tank 27. The spool valve 31 is normally conveniently mounted on the vehicle body at 48a and 48b, as is the load distribution unit 18 at 48c.

Within the spool valve 31 there are two channels 31a and 31b (or grooves, holes or passages) which permit fluid to flow from the conduits from 30, 43 through the spool valve 31 into the corresponding conduits 33, 42. The spool valve 31 can also vary fluid flowthrough and can close off both channels 31a and 31b simultaneously. At one end of the spool valve there is optionally a spring 31c that assists in return of the spool valve to the central stroke position. This spring is not necessary if the spool valve is mechanically connected to the rod 50.

The mechanism which causes the spool valve to move is the load distribution unit 18. In this particular embodiment the load distribution unit 18 is connected to the spool valve 31 by way of two jointed arms 49a, 49d which reduce the degree of movement transferred to the spool valve 31 which therefore can be manufactured in a conveniently smaller size. It is equally feasible to mount the spool valve 31 directly onto the end of the rod 50 of the load distribution unit 18. In FIG. 4, the rod 50 of the load distribution unit and the spool valve 31 are both represented in their central positions and it should be understood that they move correspondingly.

In the aforementioned prior Patent Application the function of the load distribution unit 18 was described in some detail and will not be described again to the same degree of detail here except to say that when the vehicle happens to be on an uneven surface, (as described above with reference to FIG. 3, when the rams 1 and 3 become foreshortened) the introduced volume of the rods into the cylinders, causes a corresponding amount of fluid to be displaced into the chambers 18a and 18c of the load distribution unit 18 thereby causing the pistons 50a and 50b which are joined to rod 50 to be displaced downward as seen in FIG. 4 in the load distribution unit. This in turn causes the spool valve mechanism 31 to be similarly moved down thereby effectively closing both the channels 31a and 31b in the conduits between the pump and tank and each of the valves 34, 35, 36, 37.

Spool valves 34, 35, 36, 37 shown in FIGS. 1, 2, 3 are respectively conveniently positioned between each wheel units and the chassis so that as the wheels travel up and down with reference to the chassis the wheel location the valves 34, 35, 36 and 37 are caused to be extended and contracted accordingly. In FIG. 4 only one such spool valve 34 is represented. It is to be understood that the other wheel locating valves associated with the other wheels are in communication with conduit branch lines 33b, 33c, 33d on the delivery circuit 33, and by conduits 42b, 42c, 42d to the return circuits 42 each connected to the spool valve 31.

The housing of the valve 34 is connected at the end 51a to the vehicle chassis 13 and at the other end 51b to the suspension strut 9 by suitable pivot connections.

The spool valves, 34, are similar to the spool valve 31 in construction although in this instance there is normally only one elongated groove or hole or passage 34a in the spool valve piston 34b.

When a load is removed from the vehicle this typically allows the gas in the gas springs or accumulators 19, 20 21, 23 into the rams 1, 2, 3 4 causes the rams to extend so that the vehicle chassis raises. If the vehicle happens to be on flat ground when the weight is uniformly removed the relative pressures of the four circuits 14, 15, 16, 17 will remain constant relative to each other and the pistons 50a and 50b in the load distribution unit 18 will not be moved. Furthermore if the weight is removed or added equidistantly between any pair of wheels, asymmetrically with respect to one of the major axes, then the rod 50, part of the load distribution unit 18, will remain stationary. If a weight is applied or removed asymmetrically with respect to both major axes the rod 50 will be caused to move to effect a redistribution of weight onto all wheels. This functioning is more fully described in the previously referred to prior patent application and hereinafter.

As represented in FIG. 4, the vehicle is in a too high position as indicated by extended condition of the ram 1 and the wheel location valve 34 which has become extended. The extension of the spool valve 34 therefore draws the valves piston 34b down which opens the channel 34a to permit fluid to be expelled from the wheel ram 1. It should be noted that the weight of the vehicle is on the two chambers of the wheel cylinder-rams and if the wheel valve 34 is opened and the central spool valve 31 also happens to be open (because no axle articulation is taking place) then the fluid under pressure will be forced through both these valves in sequence and then into the unpressurised storage tank 27, and the vehicle will thus be lowered. If the rod 50 of the load distribution unit 18 is not centrally located (because an axle articulation is taking place) then the spool valve 31 will be in the closed position and this will prevent the passage of fluid from the wheel cylinder I to the tank 27 in spite of the wheel location valve 34 being open. This prevents the unnecessary draining of the fluid out of the wheel ram 1, which would otherwise result when axle articulation occurs such as when the front and diagonally opposite rear wheels are both in holes for example.

If axle articulation occurred in a vehicle where the central spool valve 31 was not provided there would be no provision for distinguishing between the wheel being located in the correct position through axle articulation occurring or incorrectly positioned resulting from weight being removed from the vehicle.

The combination of the two valves in sequence therefore defines:

a. when it is appropriate to allow the flow of fluid from the wheel ram, to the tank 27 or b. when it is appropriate to permit fluid to flow from the pump to the wheel ram or c. when it is appropriate to prevent the flow of fluid in any direction.

These concepts may further be explained as follows:

If for example the ram 1 is too contracted, this may be the result of a load having been applied onto the vehicle or that there is a temporary axle articulation occurring. In the case of axle articulation occurring it would be inappropriate to deliver extra fluid from the pump to the common circuits of associated rams 1, 3 which are perceived to be too short, as the vehicle would then become gradually raised up with respect to diagonally opposite wheels 1, 3 at the expense of lifting the other pair of diagonally opposed wheel 2, 4 off the ground. It should be remembered that during the axle articulation motion taking place fluid is temporarily delivered into two chambers of the load distribution unit 18 and removed from the other pair of chambers, and when the wheels return to the flat ground position the fluid is immediately returned to the rams.

If on the other hand the rams are "perceived" by the valves 34, 35, 36, 37 to be too contracted and this has actually occurred because a load has been symmetrically applied onto the chassis then the spool valves 34, 35, 36, 37 and the spool valve 31 would all be in the 'open' position thereby permitting fluid to be introduced from the pump into the appropriate circuits without the fluid simultaneously escaping back to the tank.

The construction of the spool valves 34, 35, 36, 37 are such they permit a long stroke action of the spool valve so that most of the time the valve is open either between the wheel cylinder and the tank as seen in FIG. 4 or open between the wheel cylinder and the pump. An optional central neutral overlap zone is normally provided which effectively closes off both conduits when the wheel ram is just at the correct extension position, in which event no fluid introduction or extraction is required.

It should be noted that while the levelling system being disclosed describes a slow acting system commonly referred to as a passive system the same principles can be applied to fast acting systems known as "active suspension systems" which effect wheel position moves and height adjustments with major fluid motions to and from central accumulators, and a high output, engine driven hydraulic pump in response to many electronic sensors interpreting the road surface and other conditions at high speed.

When the system disclosed herein is applied to fast acting systems, such as the active systems, the central load distribution unit may be reduced in size as it is not required to act as a storage receptacle of fluid during wheel articulation motions as the fluid is primarily pumped directly to and from the tank and is not transferred to other locations within the same circuit. When the present system is used as an active suspension systems the load distribution unit 18 need only be large enough in size to sense the relative pressures of the two pairs of diagonally opposite wheel valves and to cause the movement in the spool valve 31 which in combination with the location of the wheel valves 34 to 37 permit the intelligent introduction or removal from the appropriate circuits of fluid, even at high speed.

In conventional active suspension systems weight distribution adjustments are not normally made as a result of axle articulation motions and relative motions of diagonally opposite wheels, but are rather calculated individually on the basis of the position of each individual wheel with reference to the position of the chassis and road. The advantage of using the present system in a more active suspension context is that it is sometimes advantageous to not permit an interaction of wheels as in the slow passive system.

In the previous proposal it has been assumed that the pump is switched on when corrections to the height or and voluntary tilt/trim attitude changes need to be made. This therefore requires that the vehicle is given a wide spectrum of what has to be considered an acceptable height and trim inclination for most of the time. The prior disclosed height adjustment system therefore initiates gross changes which occur periodically and which are sometimes noticeable or disturbing to the occupants of the vehicle. The slow acting height control system now disclosed on the other hand normally operates continuously and makes the assumption that the vehicle is rarely at the correct height and inclination and therefore the control system continually makes very minor and very slow adjustments which are too slow to have any real direct effect on individual fast wheel travel motions but collectively influence the average height and trim of the vehicle if the vehicles height or attitude changes from the chosen position.

Accordingly, in FIG. 4, the central load distribution unit 18 may be optionally varied in construction from the previously disclosed prior art in that the piston rod assembly 50 is maintained in a central position on average by allowing some slow leakage between chambers if the unit 50 becomes decentralised through leakages or malfunctions else where in the system. A typical recentralisation mechanism is shown in FIG. 4, will now be described.

The cylindrical tube of the load distribution unit 18 is provided with a fixed central wall numbered 52a dividing the cylinder into two fixed size chambers. Coaxially located within the cylinder and protruding through both end walls 52b, 52c and the central dividing wall 52a of the cylinder is a rod 50 bearing two pistons 50a, 50b permanently fixed to the rod 50 so that one piston is attached to the common rod within each main chamber, thereby subdividing the two main chambers into four smaller chambers comprising of two pairs of reciprocal volume chambers as shown at 18a, 18b, 18c, 18d.

Within any two chambers which are reciprocal in functional direction there are located two springs numbered 56a, 56b which urge the piston rod assembly to take up a mean central position so that each of the four chambers contains a similar volume of fluid if/when fluid is leaked from one chamber to the other. One such way of providing some leakage between chambers at the appropriate times is shown in the diagram in which the pistons 50a, 50b are provided with one or more small apertures which remain open at all times except for when the pistons are substantially located in the central position.

In FIG. 4, the pistons 50a, 50b are provided with two apertures or cylindrical holes through the pistons and all the holes may be numbered 53. Loosely fitting within each of the holes 53 there is slidably and optionally located a pin 55 with flange or head section 55a under which there is an 'O' ring which seals fluid into the chambers when the undersurface of the pin head is tightly located against the surface of the associated piston. The pins protrude through the piston and on the opposite side of the piston to the flanged head, the pins are provided with a further flange 55b which holds a spring 55c in compression between the flange 55b and the piston surface, as drawn. This spring serves to hold the piston heads 'O' ring tightly in place against the pistons surface to prevent leakage around the pin and through the oversized hole into the other chamber on the other side of the piston. The pins 55 are elongated so as to make contact with the cylinder end walls when the piston is pushed to the end wall the pin makes contact with the chambers fixed end wall. This permits sufficient slow seepage to enable the main springs 54 to relocate the piston and rod assembly 50 over a period of time so that temporary oscillations do not otherwise effect the performance and overall position of the load distribution unit. This centralisation of the rod assembly may equally well be performed with the alternative introduction of external conduits between chambers which can be arranged to allow leakage between the chambers as a consequence of any convenient triggering mechanism, such as the relative movement of the piston rod assembly and its housing.

In FIGS. 1, 2 and 3 there is shown an optional spring unit 44 which essentially may consist of a cylinder enclosing two free pistons having limited movement and being located between positioning stops and having a spring mechanism, such as an hydropneumatic accumulator, located therebetween. Thus, for example when the spring unit 44 is interconnected between two circuits such as 15, and 17 for example this provides specific extra spring resilience between these circuits without influencing any other circuits. In this way the spring rate for the pitch axis may be extended or softened so as to provide extra comfort for passengers towards the rear of the vehicle without adversely influencing the roll resistance of the other circuits.

Also in FIGS. 1 to 3 there are restrictors 47a, 47b, 47c and 47d as previously indicated. These restrictors are optionally provided to restrict the fluid flow between chambers in response to various situations such as rapid acceleration and/or deceleration. Some vehicles are supplied with wheel supporting arms and rods with a specific type of geometry which is designed to minimise pitch and squat under high acceleration forces and since the presently proposed suspension system also provides resistance to pitch and squat movements it is sometimes beneficial to provide valves in some or all the main conduits to effectively stop the hydraulic system working in specific instances such as under hard acceleration or braking to prevent over compensation. If this is not done, some vehicles may be found to have an inbuilt predisposition towards raising up at one or both ends under acceleration or braking or both. These unwanted effects can also minimise by the careful sizing of the wheel rams, ram bores and rods with reference to the amount of gas supplied in the gas spring and in conjunction with the restrictors in the circuits.

It has been previously mentioned that the spool valve 34 in FIG. 4 comprises of the grooved piston portion with a cylindrical tube, however, the purpose and construction of the lower portion 60 has not been discussed in detail. It will be seen that the joining cleat 51b that attaches the valve to the radius rod(s) is in fact made up of a hollow tube portion 61 into which the threaded shaft 62 can be inserted. On top of this is a bulbous component 63 which represents a servo attached to the tube portion 61. This may typically comprise of a small electrical motor driving a threaded sleeve in a bearing so that the threaded sleeve is meshed with the threaded shaft 62. When the threaded sleeve which is part of the servo rotates the threaded shaft is thereby caused to be drawn down into the hollow tube 61 or to be pushed up out of same according to the sense of rotation and pitch direction of thread. A servo is fitted as above described to each of the wheel location valves.

The mechanism 60 therefore provides an adjustment means to reposition the piston portion of the spool valve 34 with reference to the ports accommodating tubes 38, 33a and 42a. For example, when the threaded rod 62 is wound out of the tube 61 by the servo 63, the spool valves piston is thrust upwards so that a new higher position is established in the cylinder at which point the spool valve switches fluid from being returned from the main circuit to the tank 27 to receiving fluid from the pump to the main circuit. This then causes the associated circuit and ram to perceive that the ram is too contracted (the vehicle is too low) and this will then cause the vehicle to be raised until the new height is established at which point the valve switches over. The servo may comprise of a small electrical motor such as that found in electrical window winders or electrical car window winders and some such motors can be accurately calibrated to turn a precise number of revolutions to cause the vehicle to be raised or lowered evenly when all the servo motors are operated simultaneously. The electrical control and switching mechanism may either be initiated automatically or controlled manually by the vehicle operator according to specific requirements. All four servos may therefore be electrically linked and incorporate a reference datum point to ensure that all four valves, and therefore wheels, adopt the correct relative position to each other and the chassis.

Additionally, it can be arranged that the vehicles operator or another agent (such as a mercury switch) may cause two of the spool valves eg 34, 37 to adjust their switching positions to raise the left side while the other sides valves (eg 35, 36) are caused to lower the right side of the vehicle to enable the vehicle to adopt a roll position for ease of loading for example.

Alternatively the two valves 34, 35 associated with the two front wheels may, for example be adjusted upwards to cause the main circuits 14, 16 to be open to the pump to raise the front of the vehicle while the rear two valves 36, 37 may be instructed to either maintain their level or dump fluid to the tank whereby the rear of the vehicle will subside while the front is raised up.

The adjustment means as described by 60 would normally be connected to a switching mechanism conveniently located near the driver. The switch itself may be the same or similar to known switches that are commonly used for the four way controls of remote mirror positions which are adjustable from within the occupants compartment.

Alternatively the electrical control switches (not illustrated) and the servo mechanism 61 described above may be omitted if only one position of vehicle height is ever required. Alternatively again, the adjustable length component 60, to 63 may be made up of a cable mechanism similar to known clutch or brake cable mechanisms which are able to contract or lengthen the adjustable portions' length thereby effectively establishing new heights or trim levels at the operators behest. The four (or optionally eight) cables may conveniently terminate within the drivers compartment and all four may be operated collective by for example running all four cables over a small adjustable position pulley wheel attached to a control lever and additionally the four cables may each divide into two to become paired with the cables originating from the orthogonally disposed wheels so that as a lever arm tightens two cables (for example those associated with the front wheels) the two rear wheel cables are permitted to relax (and be drawn back to pretensioning springs within the unit equivalent to 60), so that the rear of the vehicle becomes lowered as fluid from the rear rams and circuits is returned to the tank.

It should be noted that reverse engineering techniques can be applied to make alternative mechanisms similar to those described herewith and such devices may achieve similar end results, but these are considered dependent upon and pursuant to the principles embodied in the mechanisms described above, and as such, behest the alternative parallel embodiments are considered to be encompassed within the scope of this patent application.

I claim:

1. A suspension system for a vehicle having a load vehicle body, and at least one pair of front ground engaging wheels and at least one pair of rear ground engaging wheels connected to the vehicle body to support same and each wheel being displaceable relative to the vehicle body in a generally vertical direction, the suspension system comprising a double acting ram interconnected between each wheel and the vehicle body, each ram including first and second fluid filled chambers varying in volume in response to relative vertical movement between the respective wheel and the vehicle body, each front wheel ram being connected to the diagonally opposite rear wheel ram by a respective pair of fluid communicating conduits, a first one of said pair of conduits connecting the first chamber of the front wheel ram to the second chamber of the rear wheel ram and the second one of said pair of conduits connecting the second chamber of the front wheel ram to the first chamber of the rear wheel ram, each pair of conduits and the front and rear wheel rams interconnected thereby constituting a respective fluid circuit whereby first and second fluid circuits are formed, and a pressure distribution means operatively interposed between the first and second fluid circuits and adapted to substantially maintain pressure equilibrium between said fluid circuits, said pressure distribution means comprising two primary pressure chambers, each divided into two individual secondary pressure chambers by force transfer means therebetween, the force transfer means in each primary pressure chamber being operatively interconnected by interconnection means to transfer motion therebetween, a fluid reservoir to receive fluid from the fluid communicating conduits, a fluid pump to deliver fluid to the fluid communicating conduits, individual wheel valve means operable in response to the disposition of an individual respective wheel relative to the vehicle body, control means operable in response to the disposition of the force transfer means within the pressure distribution means, said wheel valve means and control means together selectively provide fluid communication between the fluid communicating conduits and the pump or reservoir, to thereby adjust and maintain a desirable attitude and height of the vehicle to compensate for loading and other changes.

2. The vehicle suspension system as claimed in claim 1, wherein the wheel valve means includes an individual actuator means at each wheel operable in response to movement between the respective wheel and the vehicle body beyond a preselected vertical extend in either direction, to selectively communicate the ram of that wheel with the pump or reservoir via the control means to raise or lower the vehicle.

3. The vehicle suspension system as claimed in claim 1, wherein said pressure distribution means comprises two primary chambers each divided into two secondary chambers by respective pistons, said pistons being interconnected to move in unison in the respective primary chambers, the secondary chambers on the same side of the respective pistons being connected to the respective conduits of one pair of circuits, and the secondary chambers on the opposite side of the respective pistons being connected respectively to the conduits of the other pair of circuits, whereby in use the pistons will occupy a position in the respective primary chambers where the pressure in said two pairs of circuits is equalized, said piston being operatively connected to said control means to isolate both the pump and reservoir in response to movement of the pistons in either direction by at least a selected extend from a central position to prevent fluid adjustment taking place to alter at least one of height and attitude in response to articulation.

4. The vehicle suspension system as claimed in claim 2, wherein said pressure distribution means comprises two primary chambers each divided into two secondary chambers by respective pistons, said pistons being interconnected to move in unison in the respective primary chambers, the secondary chambers on the same side of the respective pistons being connected to the respective conduits of one pair of circuits, and the secondary chambers on the opposite side of the respective pistons being connected respectively to the conduits of the other pair of circuits, whereby in use the pistons will occupy a position in the respective primary chambers where the pressure in said two pairs of circuits is equalized, said piston being operatively connected to said control means to isolate both the pump and reservoir in response to movement of the pistons in either direction by at least a selected extend from a central position to prevent fluid adjustment taking place to alter at least one of height and attitude in response to articulation.

5. The vehicle suspension system as claimed in claim 1, wherein the wheel valve actuation means is adjustable to vary the disposition of the respective wheels at which it is activated.

6. The vehicle suspension system as claimed in claim 4, wherein the wheel valve actuation means is adjustable to vary the disposition of the respective wheels at which it is activated.

7. The vehicle suspension system as claimed in claim 5, wherein the wheel valve actuation means of each wheel are independently or collectively adjustable to vary the disposition of the wheel or wheels at which it is activatable to effect attitude and height changes as required.

8. The vehicle suspension system as claimed in claim 6, wherein the wheel valve actuation means of each wheel are independently or collectively adjustable to vary the disposition of the wheel or wheels at which it is activatable to effect attitude and height changes as required.

9. The vehicle suspension system as claimed in claim 3, wherein the pressure distribution means includes correction means responsive to sense and initiate correction of inbalance of fluid volume between the circuits without effecting substantial height and attitude changes of the vehicle.

10. The vehicle suspension system as claimed in claim 4, wherein the pressure distribution means includes correction means responsive to sense and initiate correction of inbalance of fluid volume between the circuits without effecting substantial height and attitude changes of the vehicle.

11. The vehicle suspension system as claimed in claim 9, wherein said correction means includes passage means in each piston to permit controlled flow of fluid between the secondary chambers on either side of said piston.

12. The vehicle suspension system as claimed in claim 10, wherein said correction means includes passage means in each piston to permit controlled flow of fluid between the secondary chambers on either side of said piston.

13. The vehicle suspension system as claimed in claim 11, wherein said passage means includes valve means in each piston to permit controlled flow of fluid between the secondary chambers on either side of said piston.

14. The vehicle suspension system as claimed in claim 12, wherein said passage means includes valve means in each piston to permit controlled flow of fluid between the secondary chambers on either side of said piston.

* * * * *